(12) United States Patent
Contet et al.

(10) Patent No.: US 12,366,467 B2
(45) Date of Patent: Jul. 22, 2025

(54) METHOD AND SYSTEM FOR MANUFACTURING A SENSOR BY MEANS OF MARKS AND MARKINGS, AND CORRESPONDING SENSOR

(71) Applicant: Continental Automotive Technologies GmbH, Hannover (DE)

(72) Inventors: Hervé Contet, Toulouse (FR); Norbert Genevois, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 299 days.

(21) Appl. No.: 18/031,720

(22) PCT Filed: Oct. 14, 2021

(86) PCT No.: PCT/EP2021/078530
§ 371 (c)(1),
(2) Date: Apr. 13, 2023

(87) PCT Pub. No.: WO2022/079206
PCT Pub. Date: Apr. 21, 2022

(65) Prior Publication Data
US 2023/0384127 A1 Nov. 30, 2023

(30) Foreign Application Priority Data

Oct. 14, 2020 (FR) ...................................... 2010478

(51) Int. Cl.
*G01D 11/24* (2006.01)
*G01D 5/14* (2006.01)
(52) U.S. Cl.
CPC ........... *G01D 11/245* (2013.01); *G01D 5/147* (2013.01)

(58) Field of Classification Search
CPC ............................ G01D 11/245; G01D 5/147
See application file for complete search history.

(56) References Cited

U.S. PATENT DOCUMENTS

2009/0015243 A1   1/2009 Asa

FOREIGN PATENT DOCUMENTS

| EP | 3598853 A1 * | 1/2020 | ........... G06K 7/0095 |
| FR | 3059202 A1 * | 5/2018 | ....... B29C 45/14065 |

OTHER PUBLICATIONS

International Search Report and Written Opinion for International Application No. PCT/EP2021/078530, mailed Jan. 10, 2022, 9 pages.

(Continued)

*Primary Examiner* — Jamel E Williams
(74) *Attorney, Agent, or Firm* — Buchanan Ingersoll & Rooney PC

(57) ABSTRACT

A method for manufacturing a sensor for motor vehicles, includes placing a camera facing the leadframe to generate a sequence of images showing at least one positioning reference system and at least one measurement cell or an integrated circuit, detecting the at least one measurement cell or integrated circuit in images generated by the camera, determining the position of the at least one measurement cell or integrated circuit relative to the at least one reference system, applying a first marking to the baseplate, the first marking containing information representing the determined position, overmolding the assembly formed by the support zone and integrated circuit, with the at least one reference system still being visible, positioning the magnetic element in the electromagnetic proximity of the at least one measurement cell, detecting the magnetic element in the images generated by the camera, determining the position of the magnetic element relative to the at least one reference system, and applying a second marking to the sensor, the (Continued)

second marking containing information representing said determined position.

10 Claims, 4 Drawing Sheets

(56) References Cited

OTHER PUBLICATIONS

International Search Report and Written Opinion for International Application No. PCT/EP2021/078530, mailed Jan. 10, 2022, 15 pages (French).
French Search Report for French Application No. 2010478, dated Jun. 10, 2021 with translation, 11 pages.

* cited by examiner

METHOD AND SYSTEM FOR MANUFACTURING A SENSOR BY MEANS OF MARKS AND MARKINGS, AND CORRESPONDING SENSOR

CROSS REFERENCE TO RELATED APPLICATIONS

This application is the U.S. National Phase Applications of PCT International Application No. PCT/EP2021/078530, filed Oct. 14, 2021, which claims priority to French Patent Application No. 2010478, filed Oct. 14, 2020, the contents of such applications being incorporated by reference herein.

FIELD OF THE INVENTION

The present invention relates to the field of sensors for motor vehicles and more particularly to a method for manufacturing a sensor and to a sensor for motor vehicles. The invention notably aims to improve the precision of existing sensors.

BACKGROUND OF THE INVENTION

In certain types of sensor used in motor vehicles, such as for example camshaft or crankshaft position or speed sensors, the sensor comprises an integrated circuit and a magnet, disposed in line with said integrated circuit, which has measurement cells. Such superposition allows these measurement cells of the integrated circuit to measure the electromagnetic field variations perceived by the magnet. In one known solution, the integrated circuit takes the form of a flat plate of rectangular shape overmolded with a polyepoxide material, while the magnet takes the form of a hollow cylinder of circular cross section.

In a known way, such a sensor is manufactured in multiple steps. First of all, a leadframe having pins is formed in a metal baseplate and connected to the frame of said baseplate by leads, then the integrated circuit is placed on the leadframe and electrically connected to each of the pins. After that, with the leadframe still being connected to the frame of the baseplate, the integrated circuit and the leadframe are coated with an overmolding, while allowing the pins to project out so as to enable the electrical connection of the sensor in the vehicle later on. After that, the magnet is fixed to the overmolding of the leadframe and the integrated circuit, in line with said integrated circuit. Integral overmolding can then be performed before the leads connecting the leadframe to the frame are broken so that the sensor is ready to be used in a vehicle.

However, the positioning of the integrated circuit on the leadframe, the overmolding of the leadframe and the integrated circuit, and the positioning of the magnet in order to fix it to the overmolding of the leadframe and the integrated circuit each incur positioning tolerances. Notably, in the existing manufacturing methods, the minimum number of tolerances observed in the manufacturing dimension chain is four: the position of the measurement cells of the integrated circuit in relation to the baseplate, the position of the integrated circuit in relation to the baseplate, the position of the baseplate in relation to the overmolding, and the position of the overmolding in relation to the magnet. Notably, the integrated circuit can be positioned in relation to the baseplate relative to reference systems located on the baseplate which are relatively far away from the measurement cells, thereby increasing the tolerance, and which disappear as soon as the sensor is separated from the baseplate.

However, these tolerances are not necessarily controlled and accumulate, thereby possibly significantly reducing the precision of the sensor.

There is a need for a simple, reliable and effective solution for manufacturing a sensor that makes it possible to improve the reproducibility of the manufacture of such a sensor, notably the mutual positioning of the elements of the sensor, in order to reduce the number of tolerances and thus increase the precision of said sensor.

SUMMARY OF THE INVENTION

To that end, an aspect of the invention relates first of all to a method for manufacturing a sensor for motor vehicles, said sensor comprising a leadframe, an integrated circuit and a magnetic element, said leadframe having a support zone for said integrated circuit and a plurality of branches constituting electrical tracks, said branches comprising at least one positioning reference system, the integrated circuit comprising at least one measurement cell, said magnetic element being mounted in the electromagnetic proximity of the at least one measurement cell, said method comprising the following steps:

placing the integrated circuit on the support zone of the leadframe formed in a metal baseplate,
electrically connecting the integrated circuit to the branches of the leadframe,
placing a camera facing the leadframe so as to generate a sequence of images showing the at least one positioning reference system and the at least one measurement cell or the integrated circuit,
detecting the at least one measurement cell or the integrated circuit in the images generated by the camera,
determining the position of the at least one measurement cell or the integrated circuit relative to the at least one positioning reference system,
applying a first marking to the baseplate, said first marking indicating said determined position,
overmolding the assembly formed by the support zone and the integrated circuit, preferably using a polyepoxide material, with the at least one positioning reference system still being visible,
positioning the magnetic element in the electromagnetic proximity of the at least one measurement cell,
detecting the magnetic element in the images generated by the camera,
determining the position of the magnetic element relative to the at least one cell via the at least one positioning reference system and the first marking,
applying a second marking to the sensor, said second marking indicating said determined position.

The method according to an aspect of the invention therefore makes it possible to reduce the manufacturing dimension chain down to only two tolerances (position of the measurement cells relative to the reference systems and position of the magnet relative to the reference systems) when the measurement cells are detected by the camera, and down to only three tolerances (position of the measurement cells in relation to the integrated circuit, position of the measurement cells relative to the reference systems and position of the magnet relative to the reference systems) when the measurement cells are not detected by the camera, thus making it possible to significantly improve the precision of the sensor. Moreover, when a sensor proves to be imprecise during use, the ability to track the one or more positions coded in the second marking makes it possible to subsequently correct the positioning of the elements (integrated circuit, overmolding, magnetic element) during the subsequent manufacture of other sensors.

Preferably, the first marking and the second marking take the form of a code containing the determined position, such a code being a simple and effective way of storing the position information.

More preferably still, the code is a two-dimensional barcode, preferably of "data matrix" type, such a code being simply and quickly readable.

According to one aspect of the invention, the second marking is applied to the magnetic element such that it can still be visible on the finished sensor after final overmolding, in order to be easily readable. The second marking can thus still be visible on the finished sensor after final overmolding, thereby consequently making it possible to very precisely know the relative position of the at least one measurement cell or the integrated circuit in relation to the magnetic element for each sensor manufactured by the method according to an aspect of the invention.

In a variant or in addition, the second marking is applied to the overmolding of the magnetic element where appropriate, for example on the overmolding side, in order to make it visible when the sensor is mounted in certain suitable positions.

Advantageously, the method moreover comprises, between the overmolding step and the step of positioning the magnetic element, a step of determining the position of the overmolding relative to the at least one positioning reference system and a step of applying a third marking to the baseplate, said third marking indicating said determined position. This third marking can be used to know the relative position of the overmolding in relation to the measurement cells and to the magnetic element. The advantage is being able to know, with a certain precision, the position of the measurement cells and the magnetic element in the finished product, if this subassembly is reworked taking the epoxy casing as reference. This information could advantageously be added to the second marking.

The information about the position of the overmolding relative to the at least one positioning reference system can also be added to the second marking in order to be able to have this information on the finished sensor.

More advantageously still, the magnetic element is placed in the electromagnetic proximity of the at least one measurement cell at a predetermined fixed distance from said integrated circuit so as to form a space between the magnetic element and the integrated circuit in order to improve the precision of the measurements.

An aspect of the invention also relates to a system for manufacturing a sensor for motor vehicles, said system comprising a camera and a control unit able to implement the method as presented previously.

An aspect of the invention also relates to a computer program product being remarkable in that it contains a set of program code instructions that, when they are executed by one or more processors, configure the one or more processors to implement a method as set out above.

An aspect of the invention also relates to a sensor for motor vehicles, said sensor comprising a leadframe, an integrated circuit and a magnetic element, said leadframe having a support zone for said integrated circuit and a plurality of branches electrically connected to the integrated circuit and constituting electrical tracks for connecting the sensor to an electrical connector of the vehicle, the integrated circuit comprising at least one measurement cell, said magnetic element being mounted in the electromagnetic proximity of the at least one measurement cell, said sensor being remarkable in that the branches comprise at least one positioning reference system and in that it comprises a second marking indicating the position of the magnetic element relative to the at least one positioning reference system.

An aspect of the invention also relates to a motor vehicle comprising a sensor as presented previously.

BRIEF DESCRIPTION OF THE DRAWINGS

Other features and advantages of aspects of the invention will become more apparent upon reading the following description. This description is purely illustrative and should be read with reference to the appended drawings, in which.

DETAILED DESCRIPTION OF THE PREFERRED EMBODIMENTS

The sensor according to an aspect of the invention is intended to be mounted in a vehicle, notably a motor vehicle, in the electromagnetic proximity of an element capable of causing the magnetic field to vary, for example a target of a driveshaft of said vehicle. The sensor may, for example, be a position sensor for determining the angular position of a shaft, for example a crankshaft or a camshaft, or a speed sensor for determining the rotational speed of a shaft, notably a crankshaft or a camshaft. Since the measurement and application functions of this type of sensor are known per se and do not form the subject matter of an aspect of the invention, they will not be detailed further here. In particular, it will be noted that an aspect of the invention could be applied to any type of sensor for measuring magnetic-field variations, having a measurement cell comprising an integrated circuit and a magnetic element that needs to be disposed in the electromagnetic proximity of said integrated circuit, notably such as a Hall-effect measurement cell.

Figure 1:
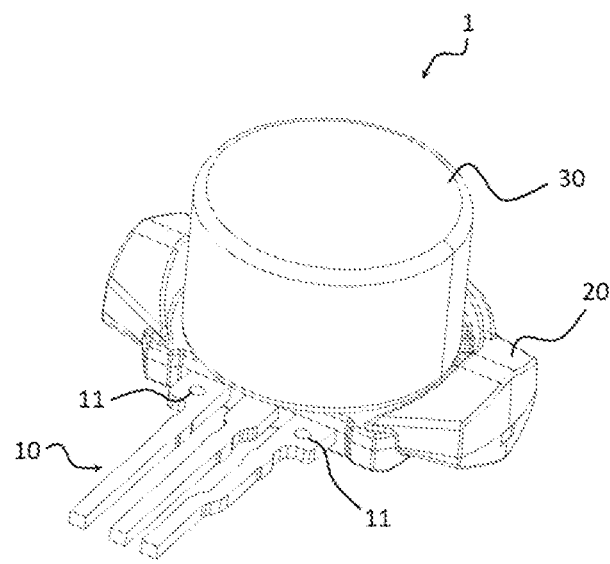
FIG. 1 schematically illustrates, in perspective, one embodiment of the sensor according to the invention.

FIG. 1 shows an example of a sensor 1 according to an aspect of the invention. The sensor 1 comprises a leadframe 10, an overmolding 20, a magnetic element taking the form of an overmolded magnet 30, and an integrated circuit 40 that is coated with the overmolding and therefore cannot be seen in FIG. 1 but can be seen in FIG. 3.

The leadframe 10 is made from a metal material and comprises branches 10-1 constituting electrical tracks for electrically connecting the sensor 1 to a processor of the vehicle in order to send it the data and/or signals generated by said sensor 1. In the example described in the figures, and in a known way, the branches 10-1 are disposed next to one another and there are three of them: a branch for supplying power to the sensor 1, a ground branch and a transmission branch enabling the sensor 1 to send signals containing the data measured by said sensor 1. In another embodiment, there could be fewer than or more than three branches.

Figure 2:
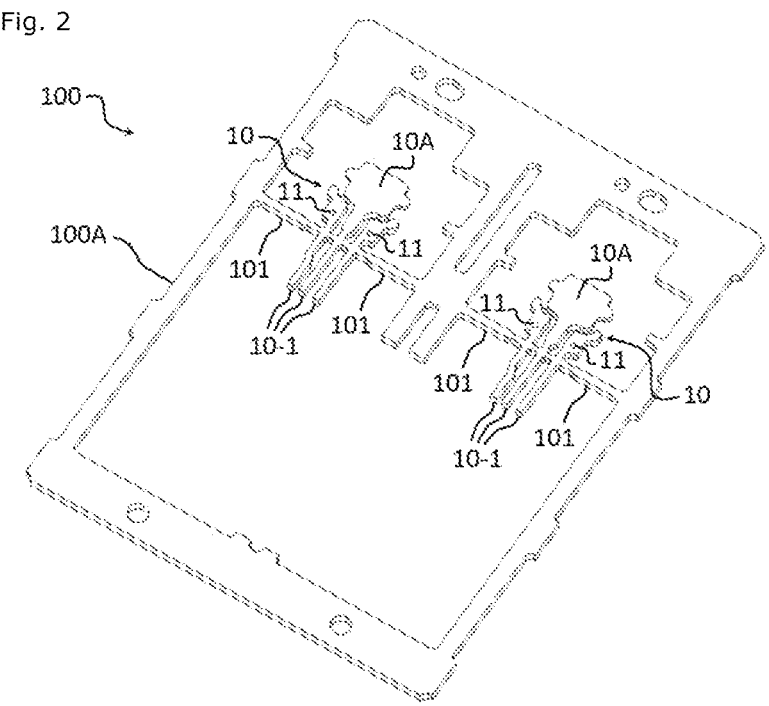
FIG. 2 schematically illustrates, in perspective, two leadframes of the sensor from FIG. 1, fixed to a frame.
Figure 3:
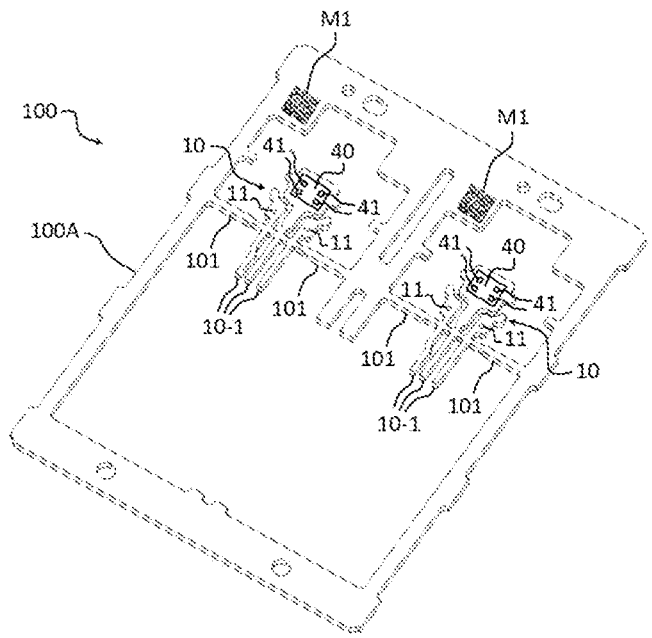
FIG. 3 schematically illustrates, in perspective, the leadframes from FIG. 2, on each of which an integrated circuit is mounted.

With reference to FIG. 2, which shows a metal baseplate 100 in which two leadframes have been formed, for example by machining or by material deflection or any other suitable method, the leadframe 10 comprises, in addition to the branches 10-1, a substantially planar support zone 10A for receiving the integrated circuit 40, as illustrated in FIG. 3.

The integrated circuit 40 is fixed to the support zone 10A, for example by adhesive bonding, and is electrically connected to the branches 10-1 of the leadframe 10.

The overmolding 20 coats both the support zone 10A and the integrated circuit 40 in order to protect them. The overmolding is preferably made from a polyepoxide material. The overmolding 20 partially covers the leadframe 10, while allowing the three branches 10-1 to project out and leaving visible the reference systems 11 described below.

Figure 5:
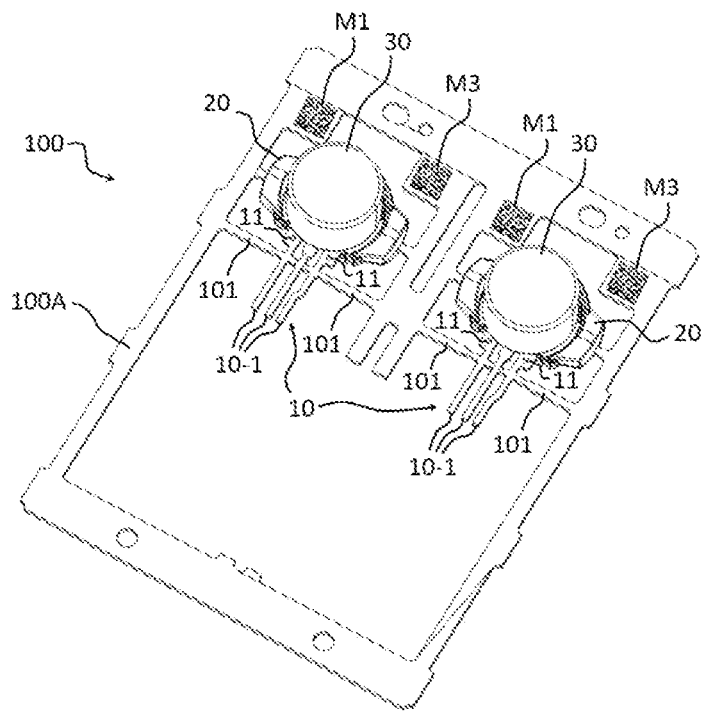
FIG. 5 schematically illustrates, in perspective, the leadframes and the overmoldings from FIG. 4, on each of which a magnet has been placed.

With reference to FIGS. 1 and 5, the magnet 30 in this instance takes a substantially cylindrical form with a circular cross section, although this does not have a limiting effect on the scope of the present invention. The magnet 30 is fixed to the overmolding 20 in the proximity of the integrated circuit 40. With reference to FIG. 3, the integrated circuit 40 comprises a plurality of measurement cells 41, four in this example, for measuring the magnetic-field variations, generated, for example, by the passage of a driveshaft of the vehicle, in the proximity of the magnet 30. The magnet 30 is placed so as to interact electromagnetically with the measurement cells 41. In order to improve the precision of the sensor 1, the magnet 30 is preferably centered with respect to the measurement cells 41. In other words, the measurement cells 41 are preferably distributed as evenly as possible around the center of the magnet 30. In a variant, the magnet 30 is not necessarily centered on the measurement cells 41.

According to an aspect of the invention, the branches 10-1 of the leadframe 10 comprise at least one reference system 11 constituting a positioning reference for the measurement cells 41 or the integrated circuit 40 in relation to said branches 10-1, for the one part, and for the magnet 30 in relation to said branches 10-1, for the other part. In the example described in the figures, the sensor 1 comprises two positioning reference systems 11 each taking the form of an orifice formed in each of the outer branches 10-1 of the set of three branches 10-1, for example by boring.

Preferably, and in this example, the reference systems 11 are positioned in the immediate proximity of the overmolding 5 in order to increase the precision of the positioning of the measurement cells 41 (or the integrated circuit 40) in relation to the leadframe 10 and the positioning of the magnet 30 in relation to the measurement cells 41, as will be explained below. The use of two positioning reference systems 11 rather than a single one makes it possible to improve the precision of the positioning of the measurement cells 41 (or the integrated circuit 40) in relation to the leadframe 10 and the positioning of the magnet 30 in relation to the measurement cells 41. In another embodiment, the sensor 1 could comprise more than or fewer than two positioning reference systems 11. Moreover, the positioning reference systems 11 could be placed at other locations of the sensor 1 or on the baseplate 100, but preferably as close as possible to the measurement cells 41 in order to improve the precision of the sensor 1 and to retain these reference systems 11 on the sensor 1 once said sensor 1 has been detached from its frame 100A.

A preferred embodiment of the method for manufacturing the sensor 1 will now be described with reference to FIGS. 2 to 7.

The sensor 1 is manufactured by a manufacturing system comprising a camera and a control unit.

First of all, the leadframe 10 is manufactured from a baseplate 100 as illustrated in FIG. 2, which illustrates the formation of two leadframes 10 in one and the same baseplate 100 in order to make the manufacture of the sensors 1 faster and less expensive on an assembly line.

The leadframes 10 are formed in the baseplate 100 in a step E0 by machining or deflection or any suitable method. When the leadframes 10 have been formed, the leadframes each remain connected to the frame 100A of the baseplate 100 at the two outer branches via two leads 101 for the remainder of the manufacture of the sensor 1.

Then, in a step E1, with reference to FIG. 3, the integrated circuit 40 is fixed to the support zone 10A of the leadframe 10, which has been formed beforehand in a metal baseplate 100 in a manner known per se. The integrated circuit 40 can be fixed to the support zone 10A by adhesive bonding or using an adhesive tape, for example. Preferably, when it is being positioned on the support zone 10A, the integrated circuit 40 is centered on said support zone 10A.

The integrated circuit 40 is then electrically connected to the branches 10-1 of the leadframe 10, for example by welding, in a step E2, in a manner known per se.

A camera (not shown) placed facing the leadframe 10 makes it possible to generate images of said leadframe 10, in particular of the two orifices constituting the positioning reference systems 11 and of the support zone 10A. These images are sent in real time to the control unit, which then detects the measurement cells 41 or the integrated circuit 40 in the received images in a step E3, by any known detection method. Depending on the quality of the images and on the detection method used, the control unit preferably detects the measurement cells 41 or, by default, the outline of the integrated circuit 40.

The control unit then, in a step E4, determines the position of the measurement cells 41 or, by default, of the integrated circuit 40 relative to the two orifices constituting the positioning reference systems 11 and stores this relative position in its memory area. The control unit inserts the information about the relative position into a first marking M1 or code, for example of "data matrix" code type, which is then etched onto the baseplate 100 in a step E5 (FIG. 3). This information about the relative position is used in the remainder of the manufacturing method for the placement of the magnet 30.

Figure 4:
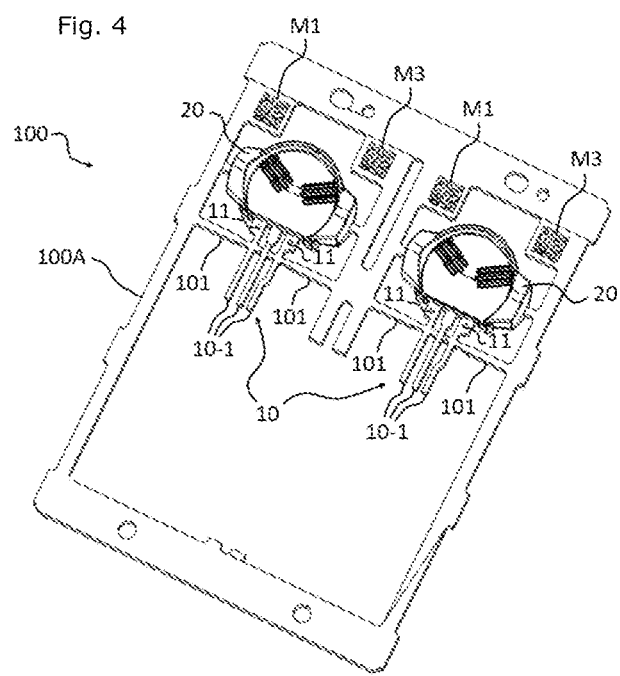
FIG. 4 schematically illustrates, in perspective, the leadframes from FIG. 3, each covered by an overmolding.

With reference to FIG. 4, with the leadframes 10 still being connected to the frame 100A of the baseplate 100 by the leads 101, an overmolding 20 of the assembly formed by the support zone 10A and the integrated circuit 40 is carried out, for example using a polyepoxide material, over each leadframe 10 in a step E6, while still leaving the reference systems 11 visible afterwards.

Once the overmolding has been carried out, the magnet 30 is positioned on said overmolding in the electromagnetic proximity of the at least one measurement cell 41 and then fixed to the overmolding, for example by adhesive bonding or using an adhesive, in a step E7.

The camera then generates a sequence of images of the magnet 30 and the reference systems 11. These images are sent in real time to the control unit, which then detects the magnet 30 in the received images by any known detection method and then, in a step E8, determines the position of the magnet 30, preferably the side that will be in contact with the epoxy molding in order to do away with perpendicularity tolerances of the magnets relative to the two positioning reference systems 11 and stores this relative position in its memory area.

Figure 6:
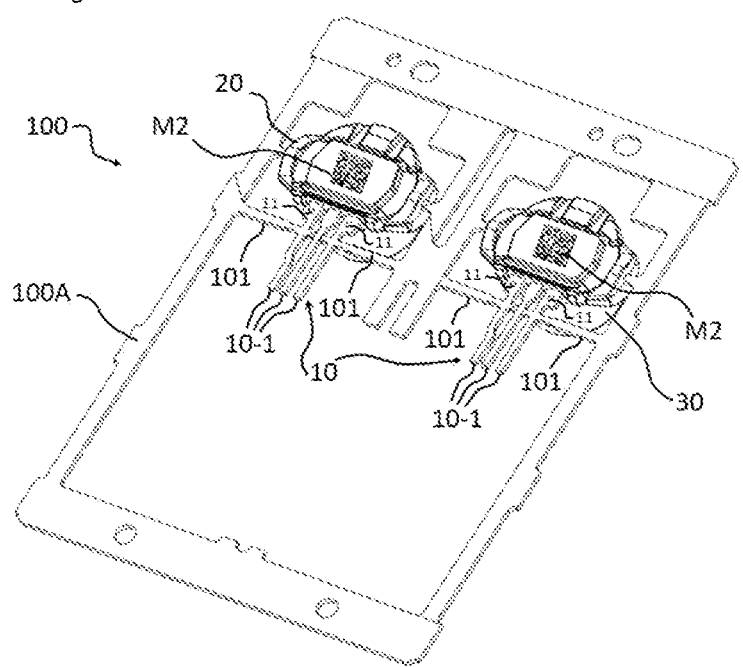
FIG. 6 is a bottom view of the assembly from FIG. 5.
Figure 7:
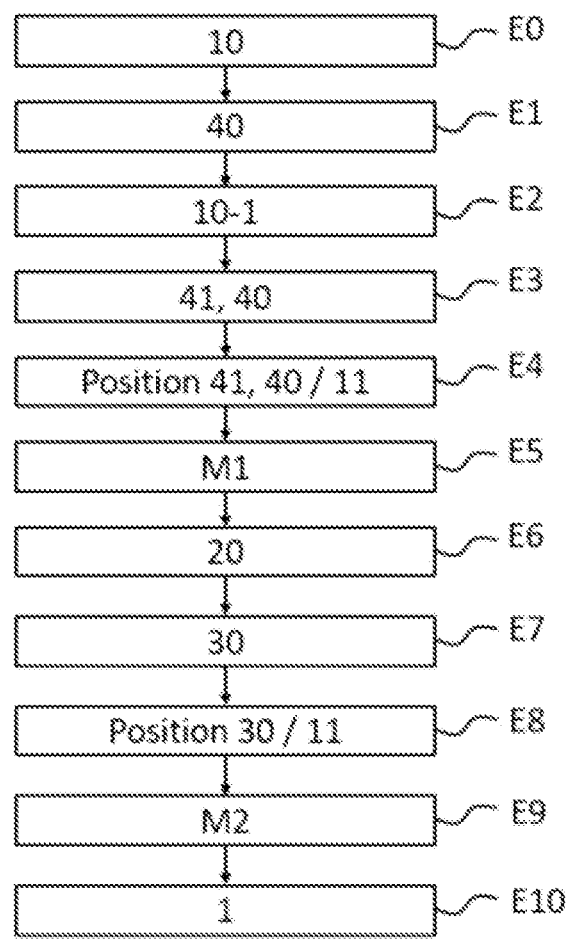
FIG. 7 illustrates one embodiment of the manufacturing method according to the invention.

The control unit inserts the information about the relative position of the magnet 30 in relation to the reference systems 11 into a second marking M2 or code, for example of "data matrix" code type, which is then etched on the overmolding 20 or on the magnet 30 (notably if the magnet 30 is made of plasto-ferrite or is overmolded) in a step E9, preferably on that face of the overmolding 20 that will be visible when the sensor 1 is in use (FIG. 6).

Advantageously, the information of the first marking M1 corresponding to the relative position of the measurement cells 41 or the integrated circuit 40 in relation to the reference systems 11 can also be inserted into this second marking M2 in order to be able to track and retain the information about the position of the measurement cells 41 (or the integrated circuit on the sensor 1 once it is detached from its frame 100A.

In a step E10, once the second marking M2 has been applied, the leads 101 are broken so as to release the sensor 1, which is then ready to be installed in a motor vehicle.

Optionally, the method may comprise, between the overmolding step and the step of positioning the magnet 30, a step of determining the position of the overmolding 20 relative to the positioning reference systems 11 and a step of applying a third marking to the baseplate 100, said third marking M3 (visible in FIGS. 4 and 5) indicating said determined position in order to improve the ability to track the manufacturing dimensions of the sensor 1 between the integrated circuit 40, the overmolding 20 and the magnet 30. This information about the position of the overmolding 20 relative to the positioning reference systems 11 can be reported in the second marking M2 made on the molding 20 after adhesively bonding the magnet in order to be able to retain this information once the sensor is finished.

The method according to an aspect of the invention therefore makes it possible to reduce the manufacturing dimension chain down to only two tolerances (position of the measurement cells 41 relative to the reference systems 11 and position of the magnet relative to the reference systems 11) when the measurement cells 41 are detected by the camera, and down to only three tolerances (position of the measurement cells 41 in relation to the integrated circuit 40, position of the measurement cells 41 relative to the reference systems 11 and position of the magnet relative to the reference systems 11) when the measurement cells 41 are not detected by the camera, thus making it possible to significantly improve the precision of the sensor along two axes. Moreover, when a sensor 1 proves to be imprecise during use, the ability to track the one or more positions coded in the second marking M2 makes it possible to subsequently correct the positioning of the elements (integrated circuit overmolding 20, magnetic element 30) during the subsequent manufacture of other sensors 1.

It is possible very readily also to imagine applications or variants without magnets in the case of magnetic and non-ferromagnetic targets.

The invention claimed is:

1. A method for manufacturing a sensor for motor vehicles, said sensor comprising a leadframe, an integrated circuit and a magnetic element, said leadframe having a support zone for said integrated circuit and a plurality of branches constituting electrical tracks, said branches comprising at least one positioning reference system, the integrated circuit comprising at least one measurement cell, said magnetic element being mounted in the electromagnetic proximity of the at least one measurement cell, said method comprising:

placing the integrated circuit on the support zone of the leadframe formed in a metal baseplate,
electrically connecting the integrated circuit to the branches of the leadframe,
placing a camera facing the leadframe so as to generate a sequence of images showing the at least one positioning reference system and the at least one measurement cell or the integrated circuit,
detecting the at least one measurement cell or the integrated circuit in the images generated by the camera,
determining the position of the at least one measurement cell or the integrated circuit relative to the at least one positioning reference system,
applying a first marking to the baseplate, said first marking indicating said determined position,
overmolding the assembly formed by the support zone and the integrated circuit, with the at least one positioning reference system still being visible,
positioning the magnetic element in the electromagnetic proximity of the at least one measurement cell,
detecting the magnetic element in the images generated by the camera,
determining the position of the magnetic element relative to the at least one positioning reference system, and
applying a second marking to the sensor, said second marking indicating said determined position.

2. The method as claimed in claim 1, wherein the first marking and the second marking take the form of a code containing the determined position.

3. The method as claimed in claim 2, wherein the code is a two-dimensional barcode, preferably of "data matrix" type.

4. The method as claimed in claim 1, wherein the second marking is applied to the magnetic element or to the overmolding.

5. The method as claimed in claim 1, further comprising, between the overmolding step and the step of positioning the magnetic element, a step of determining the position of the overmolding relative to the at least one positioning reference system and a step of applying a third marking to the baseplate, said third marking indicating said determined position.

6. The method as claimed in claim 1, wherein the magnetic element is placed in the electromagnetic proximity of the at least one measurement cell at a predetermined fixed distance from said integrated circuit so as to form a space between the magnetic element and the integrated circuit.

7. A system for manufacturing a sensor for motor vehicles, said system comprising a camera and a control unit able to implement the method as claimed in claim 1.

8. A computer program product, comprising a set of program code instructions that, when they are executed by one or more processors, configure the one or more processors to implement a method as claimed in claim 1.

9. A sensor for motor vehicles, said sensor comprising:
a leadframe,
an integrated circuit and
a magnetic element, said leadframe having a support zone for said integrated circuit and a plurality of branches electrically connected to the integrated circuit and constituting electrical tracks for connecting the sensor to an electrical connector of the vehicle, the integrated circuit comprising at least one measurement cell, said magnetic element being mounted in the electromagnetic proximity of the at least one measurement cell, wherein the branches comprise at least one positioning reference system and the sensor further comprises a second marking indicating the position of the magnetic element relative to the at least one positioning reference system.

10. A motor vehicle comprising a sensor as claimed in claim 9.

\* \* \* \* \*